(12) United States Patent
Zhang

(10) Patent No.: US 8,812,440 B2
(45) Date of Patent: Aug. 19, 2014

(54) WEB-BASED INFORMATION DELIVERY METHOD, SYSTEM, AND APPARATUS

(76) Inventor: Xuefu Zhang, Fremont, CA (US)

( * ) Notice: Subject to any disclaimer, the term of this patent is extended or adjusted under 35 U.S.C. 154(b) by 1200 days.

(21) Appl. No.: 12/117,115

(22) Filed: May 8, 2008

(65) Prior Publication Data

US 2009/0125420 A1  May 14, 2009

Related U.S. Application Data

(60) Provisional application No. 60/988,004, filed on Nov. 14, 2007.

(51) Int. Cl.
*G06F 17/30* (2006.01)
*G06Q 30/06* (2012.01)
*G06Q 30/02* (2012.01)

(52) U.S. Cl.
CPC ............ *G06Q 30/02* (2013.01); *G06Q 30/0601* (2013.01)
USPC ......................................... 707/628

(58) Field of Classification Search
CPC ................................................ G06F 17/30864
See application file for complete search history.

(56) References Cited

U.S. PATENT DOCUMENTS

| | | | |
|---|---|---|---|
| 2003/0028451 A1* | 2/2003 | Ananian | 705/27 |
| 2007/0234398 A1* | 10/2007 | Muehlbauer | 725/145 |
| 2008/0221983 A1* | 9/2008 | Ausiannik et al. | 705/14 |

* cited by examiner

*Primary Examiner* — Hosain Alam
*Assistant Examiner* — Johnese Johnson
(74) *Attorney, Agent, or Firm* — Dahyee Law Group; Leon E. Jew

(57) ABSTRACT

A method and system based on an enhanced publish-subscribe information delivery model for delivering information from information publishers to information subscribers on an Intranet or the Internet is disclosed. The invented system includes a centralized subject catalog that contains a hierarchy of categories with built-in functionality of browsing, searching, and navigation. Information publishers list information subjects in the appropriate categories in the subject catalog and publish information subsequently in terms of issues for the subject listings. Information subscribers find and make subscriptions to desired subject listings in the catalog. Then, the issues published by the publishers for the subject listings are delivered to and only to the corresponding subscribers in a timely manner. While emphasizing timeliness, the invented method and system permits great flexibility in information publication, subscription, and delivery.

24 Claims, 12 Drawing Sheets

WEB-BASED INFORMATION DELIVERY METHOD, SYSTEM, AND APPARATUS

REFERENCES CITED

| U.S. Patent Document | | |
|---|---|---|
| 5,802,518 | September 1998 | Karaev, et al. |
| 6,405,191 | June 2002 | Bhatt, et al. |
| 6,549,956 | April 2003 | Bass, et al. |
| 6,636,886 | October 2003 | Katiyar, et al. |
| 6,839,730 | January 2005 | Ramabhadran |
| 6,912,517 | June 2005 | Agnihotri, et al. |
| 7,062,507 | June 2006 | Wang, et al. |

OTHER REFERENCES

Underwood, et al. *User-Centered Push for Timely Information Delivery*, Computer Networks and ISDN Systems, Volume 30, Issue 1-7 (April 1998), pages 33-41.

Ishikawa, et al. *An Architecture for Push Information Delivery and Its Application to News Delivery System*, Proceedings of INET, 1999.

FIELD OF THE INVENTION

The invention described herein relates generally to an information delivery system and method of operation. More particularly, the invention relates to web-based system and method for timely delivering information from information publishers to and only to corresponding information subscribers. The invention also relates to an electronic commerce system or an online brokerage/marketplace where information is traded as intangible goods and to a website where information subscription and delivery services are provided.

BACKGROUND OF THE INVENTION

An information delivery system delivers information from the source (where it's produced) to the target (where it's consumed). Sometimes timing is so crucial that information must be delivered in a timely manner (or in real-time). On the other hand, such a system must make sure that information will not reach the targets where it's not requested. Conclusively, an ideal information delivery system must guarantee the accuracy, completeness, and timeliness of information delivery.

However, it has become increasingly difficult to reach these goals in an era in which the reliance on information has become more and more prominent and a tremendous amount of information has been accumulated. On one hand, people are thirty for information, increasingly depending on information and information-related technologies in their daily lives. Businesses also operate around information, and business owners and leaders rely heavily on information to make business decisions. In the mean time, information is accumulated at a pace that storage devices can hardly catch up with. As a result, people are overwhelmed and sometimes annoyed by the huge amount of information they receive, including unsolicited information such as electronic spam or junk mails. Ironically, people have difficulty obtaining the right information actually because they receive too much information.

Information is power, but only when it reaches the people who request it. More often than not, published information doesn't reach all the wanting targets when it is generated. For example, an advertisement from a store may never reach a customer looking to purchase a particular product, although the promotional price is in the range the customer wants to pay. Since the desired information delivery is not achieved, people have to retrieve the missed information later on among a huge amount of information, possibly resorting to a search engine.

As another problem of information delivery, information that reaches a wrong target bears no value and thus becomes annoying junk. For example, people who do not own a home frequently get annoyed by information they receive about home loan refinancing because the information is of no value to them.

The third problem associated with information delivery is that information is often not delivered in real-time or timely. Consequently, information whose value is strongly tied to a timely delivery loses its value if it's not delivered to the right targets in time. For example, information about a flat TV sale on Sunday doesn't help a TV buyer if the information is received on the following Tuesday.

These information delivery problems occur because the model of the current information delivery is usually either pull-based or push-based.

With a push-based delivery model, information producers push information to all possible targets in order to reach the maximum number of correct targets. For example, a grocery store sends out promotional advertisements by mail to all the people in the neighborhood, in spite of the fact that some of the people may never visit this store. As a result, information producers waste resources while information consumers that are wrong targeted get annoyed. Underwood, et al. in "User-Centered Push for Timely Information Delivery" describes such a push-based information delivery method. Ishikawa, et al. describes another technology in implementing a push-based information delivery.

With a pull-based information delivery model, however, information consumers pull information from information sources, usually by browsing or searching for the information. For example, people usually visit certain websites to get certain type of information. If they don't know which website contains the information they need, they usually use a search engine to help find web pages that might contain the needed information. Browsing and searching are often required even if the visitors know exactly which website has the information they need.

A search engine helps a consumer retrieve the information from anywhere on the Web, but at the same time it also pulls in a massive amount of seemingly related information. In reality, a search engine doesn't always return the right result. Nor does it do so without burying the requested information in a large amount of intruding information.

With either a push-based or pull-based model, there is a disconnection between the information producers and consumers and a lack of an agreement about what information should be delivered to the consumers and when it should be delivered. Because of the disconnection and the lack of the agreement, information is often delivered not to where it's mostly needed, but to where it's not needed at all. Moreover, because of the disconnection between the information producers and consumers, it is very difficult to achieve timeliness of information delivery.

A publish-subscribe model is also used for information delivery. Traditionally, newspapers and magazines are published and delivered to subscribers using such a model. Nowadays, a visitor of some websites may subscribe to, mostly, newsletters or alerts published by the owner of the site, by making a few selections and providing an email address. For instance, https://diss.state.de.us/DWS/public.diss provides a service that allows a user to subscribe to information updates provided by Delaware agencies and government entities via emails.

In the information era, publish-subscribe models are predominantly used in proprietary Enterprise Application Integration (EAI) systems, where the applications within an enterprise computer system communicate with each other by exchanging messages or events. Each message or event is published by an upstream application and matched and delivered to the corresponding downstream applications that show interest in that type of messages or events.

While a publish-subscribe based information delivery model such as those used in EAI systems has certain advantages over either push-based or pull-based models and can potentially achieve accuracy, completeness, and timeliness of information delivery, it helps little in solving the current information delivery problems due to its limitations.

First of all, EAI systems are proprietary and inoperative with each other. As a result, information publication, subscription, and delivery are restricted to one vendor or one system and have failed to scale up to larger, more generalized networks such as a large Intranet or the Internet.

Secondly, the information exchanged in an EAI system must confirm to a predefined, machine-readable format that's mutually understandable by both upstream and downstream applications. Therefore, such a system is not suitable for delivering general, free-formatted information such as news, events, articles, and personal announcement for human consumption. For instance, XML document is suitable for computer to consume but a human reader more likely prefers the same information in plain text or PDF format.

Finally, an EAI system failed to provide an efficient cataloging mechanism storing and managing information such as who are publishing and what are published, and it doesn't permit flexibility in information publication, subscription, and delivery, which is desirable for human-consumed information.

In summary, neither push-based nor pull-based information delivery fulfills the accuracy, completeness, and timeliness of information delivery. Publish-subscribe based information delivery is successful only in proprietary EAI systems and is not suitable for delivering general information on a large scale for a large audience. What's needed to completely address the information delivery problems is an method and system that achieves accuracy, completeness, and timeliness of information delivery, scales up to be suitable for delivering information on an Intranet or the Internet, delivers general information suitable for human consumption, provides a centralized information publication catalog to facilitate information publication and subscription, provides a common marketplace where information can be published, subscribed to, and delivered among a large audience of information publishers and subscribers, and allows flexibility in information publication, subscription, and delivery. The invention is such a method and system to address the current information delivery problems.

BRIEF SUMMARY OF THE INVENTION

The method and system of the invention is built on an enhanced publish-subscribe based information delivery model. In such an enhanced model, a publisher is anyone that wishes to publish information. As a counterpart, a subscriber is anyone that wishes to receive information published by a publisher. A publisher lists an information subject in a centralized catalog and a subscriber browses or searches the catalog for interesting subjects. Once a subscriber identifies an interesting subject in the catalog, he/she makes a subscription to the subject. Meanwhile, the publisher can submit and publish information in terms of issues for the subject that he/she lists. Then, the published issues will be delivered to and only to those who have made subscriptions to the subject.

In the invention, only the owner of a subject listing can publish information for the subject and the published information from the publisher is delivered to a subscriber if and only if the subscriber has subscribed to the subject, ensuring accuracy and completeness of information delivery. Moreover, since the publisher-subscriber relationship is established in advance, the published information can be delivered as soon as it becomes available to ensure timeliness of information delivery.

The centralized catalog included in the system of the invention contains a hierarchy of categories, and each category may contain a list of sub-categories or subjects. With the hierarchical structure plus the built-in functionality of browsing, searching, and navigation, the catalog enables a user to easily identify a category to list an information subject or find desired subjects to subscribe to.

Besides achieving accuracy, completeness, and timeliness of information delivery and providing a centralized catalog, the invention offers additional benefits for information publication and subscription, which differentiate the present invention from the known arts.

First of all, the invention conducts information publication and subscription on an Intranet or the Internet, enlarging the scope of information delivery.

Secondly, the invention doesn't restrict to any particular machine-readable content format and thus is more suitable for delivering general information for human consumption. Since there is no fixed content format is required, the invented method and system is suitable for publishing and delivering a large scope of general information such as news, events, alerts, articles, blogs, personal announcement, and online journal. Such information is pertinent to people's lives and of the types that they usually search for and consume.

Moreover, the invention enables anyone to participate in information publication and subscription, broadening the audience of publishers and subscribers and virtually making everyone a potential publisher/subscriber. The system of the invention creates a marketplace of information where any registered user, not just big media companies, to publish information. The marketplace of information is different from a website that provides simple subscription services for its newsletters and alerts. In the information marketplace, for example, a blogger may list a subject about his blogs in the subject catalog and then publish his blogs regularly. Anyone who subscribes to the subject will receive his blogs in the desired format via selected media at the specified delivery time. Since the system takes over the actual information delivery based on the subject listing and the subscription, information publishers can focus on content creation rather than subscription management and content delivery. With the system, subscribers also have a central place to gain all information in need and control how and when to receive information.

Finally, the invention permits great flexibility and control over information publication and receiving. For instance, a publisher can make published information available in a plurality of formats such as text, audio, and SMS message so that a subscriber can choose a desired format to consume. A publisher can also control when to publish an issue by predefining a publication schedule for a subject listing. A subscriber can similarly predefine a receiving schedule for a subscription so as to control when to receive published issues. In addition, a subscriber can also select desired delivery media such as email, fax, and even postal mail for receiving published information.

In conclusion, the invented method and system employs a subscriber-centric information delivery. A subscriber decides what information to receive, while a publisher "announces" what his/her publication is about by listing an information subject in the centralized subject catalog. While ensuring accuracy, completeness, and timeliness of information delivery, the method and system allows great flexibility for information publication and receiving. Ultimately, the invented method and system provides a marketplace where information producers and consumers meet and a brokerage where information is delivered from producers to consumers according to subject listings and subscriptions.

BRIEF DESCRIPTION OF THE DRAWINGS

The features and advantages of the invention will be apparent from the following detailed description in conjunction with the drawings, of which.

DETAILED DESCRIPTION OF THE INVENTION

Figure 1:
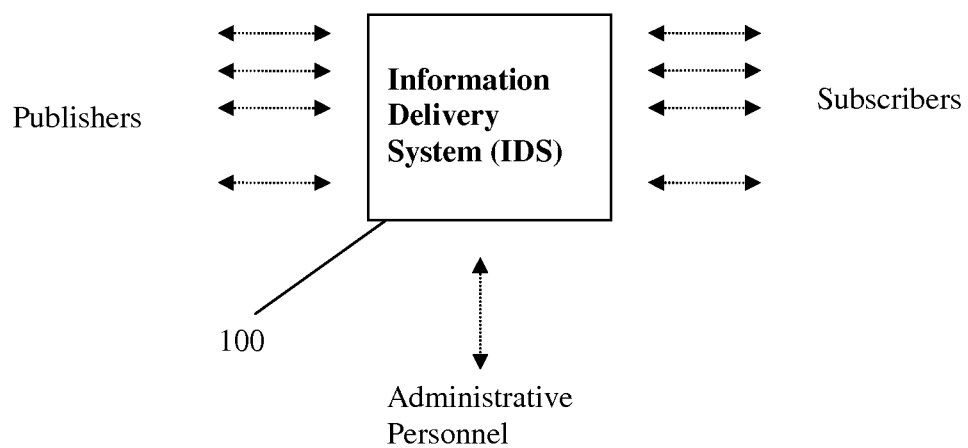
FIG. 1 illustrates the types of users of the system of the invention: publishers, subscribers, and administrative personnel.

A detailed description of an exemplary embodiment of the present invention will now be given with reference to FIG. 1-12. Although the description provides detailed examples of possible implementations of the present invention, it should be noted that these details are intended to be exemplary only and in no way delimit the scope of the invention.

TERMINOLOGIES

Information: any data that carries value such as fact or knowledge. The value is relative, given that the same piece of data could be valuable to one person or while being valueless to another.

User: a natural person or an organization who registers with the system by providing required registration information and uses the system for either publishing information or subscribing to receive information. A user can also be one from the administrative personnel that does not participate in information publication and subscription.

Publisher: a user of the system who publishes information and thus is the source or provider of the information he/she publishes. In addition, "enable a publisher" to do something means that the system executes one or more commands from the publisher to do something, such as receiving and fulfilling a publisher's request.

Subscriber: a user of the system who subscribes to receive information published by publishers and thus is an information consumer. A subscriber can also be an information publisher and vise versa. For example, a subscriber that subscribes to streaming stock quotes published by another publisher may also publishes stock market alerts. In addition, "enable a subscriber" to do something means that the system executes one or more commands from the subscriber to do something, such as receiving and fulfilling a subscriber's request.

User Group: a group of users defined by either the system or a user. There is a default user group "Everyone", which includes all users in the system. However, a user can define a number of user groups such as "friend", "classmates", and "relatives" and each such user group is a subgroup of the "Everyone" group. A user group is used to limit who may subscribe to published information.

Information Subject: a short text that describes the content of the information published for it. Thus, an information subject represents the topic of the published information. For example, an information subject can be "Daily Breaking News", "NBA Game Results", "Larry's Personal Announcement", "IPOD Sales Alert", etc. When a subscriber subscribes to receive information, the subscription is made on the information subject. Once the subscription is made, the subscriber will receive all information published for that subject. Information subjects are listed and categorized in a centralized catalog so that potential subscribers can browse or search for desired subjects.

Subject Listing: a subject that's listed in a subject catalog. Besides the subject name, a subject listing also specifies publication information such as such as publisher, description, subscription fee, and publication schedule. Therefore, besides telling what the published information is about, a subject listing also specifies how information is published.

Subject Catalog: a complete enumeration of information subjects arranged systematically with descriptive details. Subject catalog is where a publisher lists the information subjects, and also where a subscriber finds interesting subjects to subscribe to. As the number of information subjects increases, the classification and categorization of the subjects becomes important. To organize the subjects, the catalog contains a hierarchy of categories, each of which contains a list of information subjects or sub-categories. The hierarchical organization enables a subscriber to efficiently locate interesting subjects and also makes it easy for a publisher to find the most pertinent category for an information subject.

Issue: one occurrence of information release for an information subject. One or more issues may be published for a given subject, but only the publisher who lists the information subject may publish issues for the subject.

Past Issue: an issue that was published in the past. A publisher may want to keep the pass issues for a subject for future subscribers. For instance, a publisher may publish just one article for a subject. After the article is published, it will be delivered to a new subscriber as soon as the subscriber makes a subscription.

Mature Issue: an issue with respect to a subscriber that is published but yet to be delivered (to the subscriber).

Version: a format in which an issue is released. An issue can be released in different versions, meeting different subscription needs and adapting to different delivery media (defined below). For instance, an issue for breaking news can be published as plain text, images, video, audio, HTTP page, and so on, yet carrying the same or common value. An issue is always released in certain version(s). Therefore, in this disclosure an issue can mean one or all versions of the issue depending on the context without causing any ambiguity.

Delivery Media: a media via which an issue is delivered to its subscribers, such as email, voice, fax, SMS message, and postal mail. There are certain restrictions on the applicable media for a given version. For example, audio content cannot be delivered by fax.

Publication Schedule: a schedule specified by a publisher for an information subject, by which issue or issues for the subject are published and thus made available for delivery to the corresponding subscribers. A publication schedule can be either real-time (upon submission), fixed (designated for a fixed time), or on-demand (upon the publisher's request). If multiple issues are published for a subject with a fixed publication schedule, the publication schedule must specify publication time, recurrence pattern, and range of recurrence.

The recurrence pattern for a publication schedule describes when and how often issues for the subject are recurrently released. For instance, issues may be published every Friday, every other Friday, or every last Friday in the month. Depending on the complexity of the publication schedule, recurrence patterns may be combined.

The range of the recurrence for a publication schedule describes how long the recurrence will last, including a start time and an end time. The start time is the time when the first issue is published. The end time may be infinity, meaning that the recurrence lasts for ever.

Receiving Schedule: a schedule specified by a subscriber for a subscription, by which mature issues for the subscription are delivered to the subscriber. A receiving schedule can be either real-time (as soon as an issue is available), fixed (designated for a fixed time), or on-demand (upon the subscriber's request). Similar to publication schedule, if a receiving schedule is designated for a fixed time, recurrence pattern and range of recurrence may be specified to recurrently receive issues published for the subject to which the subscription is made.

Web Services: programmatic interfaces made available for application to application communication over the Web. Web services provide a standard means of interoperating between different software applications, running on a variety of platforms and/or frameworks. Web services are characterized by their great interoperability and extensibility, as well as their machine-processable descriptions thanks to the use of XML. They can be combined in a loosely coupled way in order to achieve complex operations. Programs providing simple services can interact with each other in order to deliver sophisticated added-value services. Web services sometimes also refer to a body of open standards that are used to implement web services including XML, SOAP (Simple Object Access Protocol), WSDL (Web Services Description Language), UDDI (Universal Description, Discovery and Integration), etc. In this disclosure, web services also include RESTful web services.

Method of Using the System of the Invention

An information publisher seeking to publish information will connect to the system 100 of the invention (FIG. 1) using an Internet web browser or a wireless device that has Internet access. The publisher then chooses a suitable category in the subject catalog of the system to list an information subject, and the system presents a series of questions regarding the subject. The publisher answers/fills-in those questions by providing additional information about the subject listing, including subject name, description, publication schedule, available versions, delivery media, sample publications, other pertinent information depending on the category selected, and so on. Upon completion, the publisher submits the request and confirms his/her subject listing. The system then lists the subject in the subject catalog stored in the database and makes the subject available for subscription.

Conversely, an information subscriber seeking to consume information will connect to the system 100 of the invention (FIG. 1) using Internet web browser or a wireless device that has Internet access. The subscriber selects and subscribes to a subject listed in the subject catalog based his/her interest. Then, the system presents a series of questions regarding his/her subscription. The subscriber answers/fills-in those questions by providing additional information about the subscription, including desired issue version, receiving schedule, delivery media, and other pertinent information depending on the subject and the category where the subject is listed. Upon completion, the subscriber submits the request and confirms his/her subscription. The system then stores the subscription in the database and makes it receptive for any published issues for the subject.

After a subject is listed in the system, the publisher can again connect to the system 100 and select one of his/her subject listings for which an issue is to be submitted. The system allows the publisher to submit one or more versions of an issue at a time by uploading local files to the systems or by creating or editing issue contents online. Upon success, the system stores the submitted issue in the file storage and updates the database with the submission accordingly. Then, the system delivers the issue to each subscriber according to his/her subscription that the subscriber made to the subject.

The above description depicts a typical process of information delivery performed by the system of the invention. Depending on the publication schedule of the subject listing and the receiving schedule of the subscription made by the subscriber, there can be particulars in the information delivery process, which will be covered in details below.

User Roles

Figure 2:
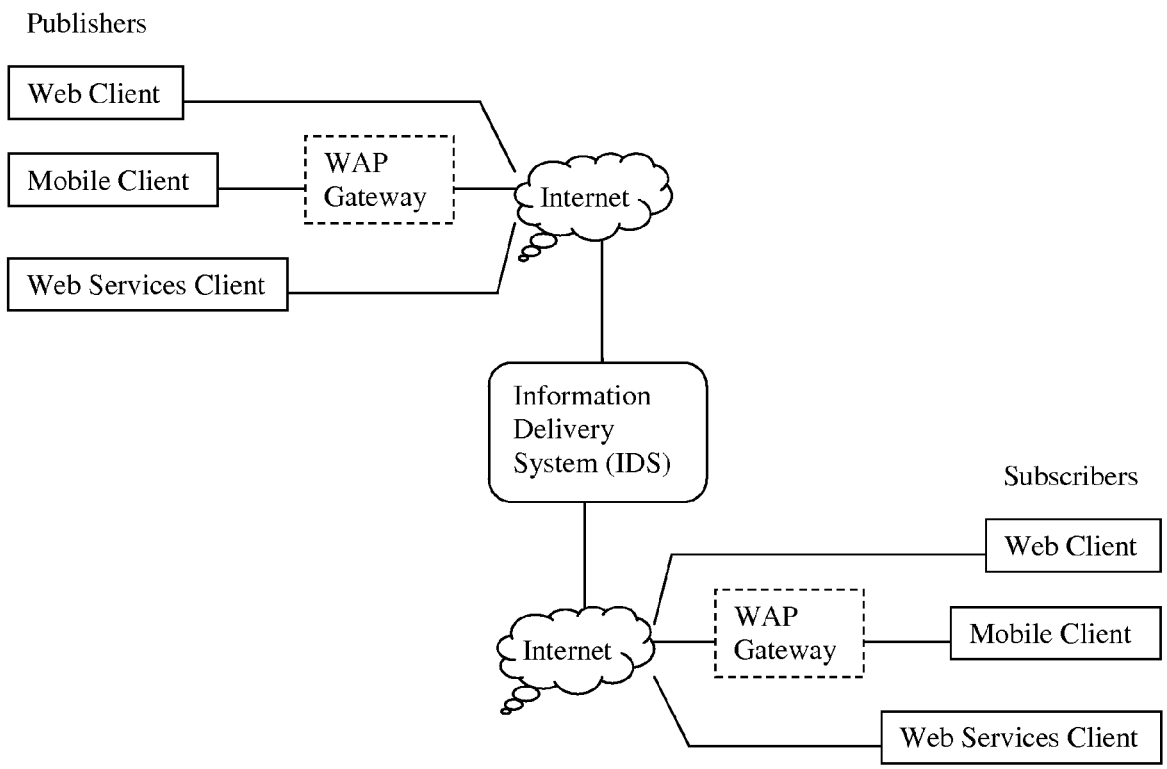
FIG. 2 illustrates the user interface options through which the users may interact with the system of the invention.

As shown in FIG. 1, the information delivery system (IDS) 100 of the invention serves three types of users, or roles: information publishers, information subscribers, and administrative personnel. Since administrative personal is not involved in the information delivery process, it's omitted in the following disclosure. As illustrated in FIG. 2, the users of the system 100 can interact with the system 100 via any one of a number of client types, including:
  a Web/Hypertext Transfer Protocol ("HTTP") Client such as a personal computer ("PC") with a Web browser connected to the Internet;
  a Web Services Client such as a computer program that programmatically consumes web services provided by the system; and
  a Wireless Application Protocol ("WAP") Client such as a cell phone.

As shown in FIG. 2, an HTTP (web browser) client or a web services client has a direct connection to the Internet. The mobile/wireless clients (cell phones, PDAs, etc.) are shown as going thorough a WAP gateway that applies the necessary transformations (message formats, addresses, etc.) for enabling a WAP client to communicate with an IP host such as the server implementing the invention. However, depending on the actual implementation of WAP, the WAP gateway may not be necessary. If it's used, the WAP gateway can be used as a standard proxy server. This is because recent release of WAP includes support for transmission control protocol/Internet protocol ("TCP/IP") and HTTP, with which wireless devices can utilize existing Internet technologies directly.

Different types of clients serve different needs. For example, HTTP client is suitable for human operators to interactively access the system while mobile client is more suitable for interacting with the system through a mobile device. Web services client is more applicable for programmatically accessing the system to achieve integration among different software applications.

Software Components

Figure 3:
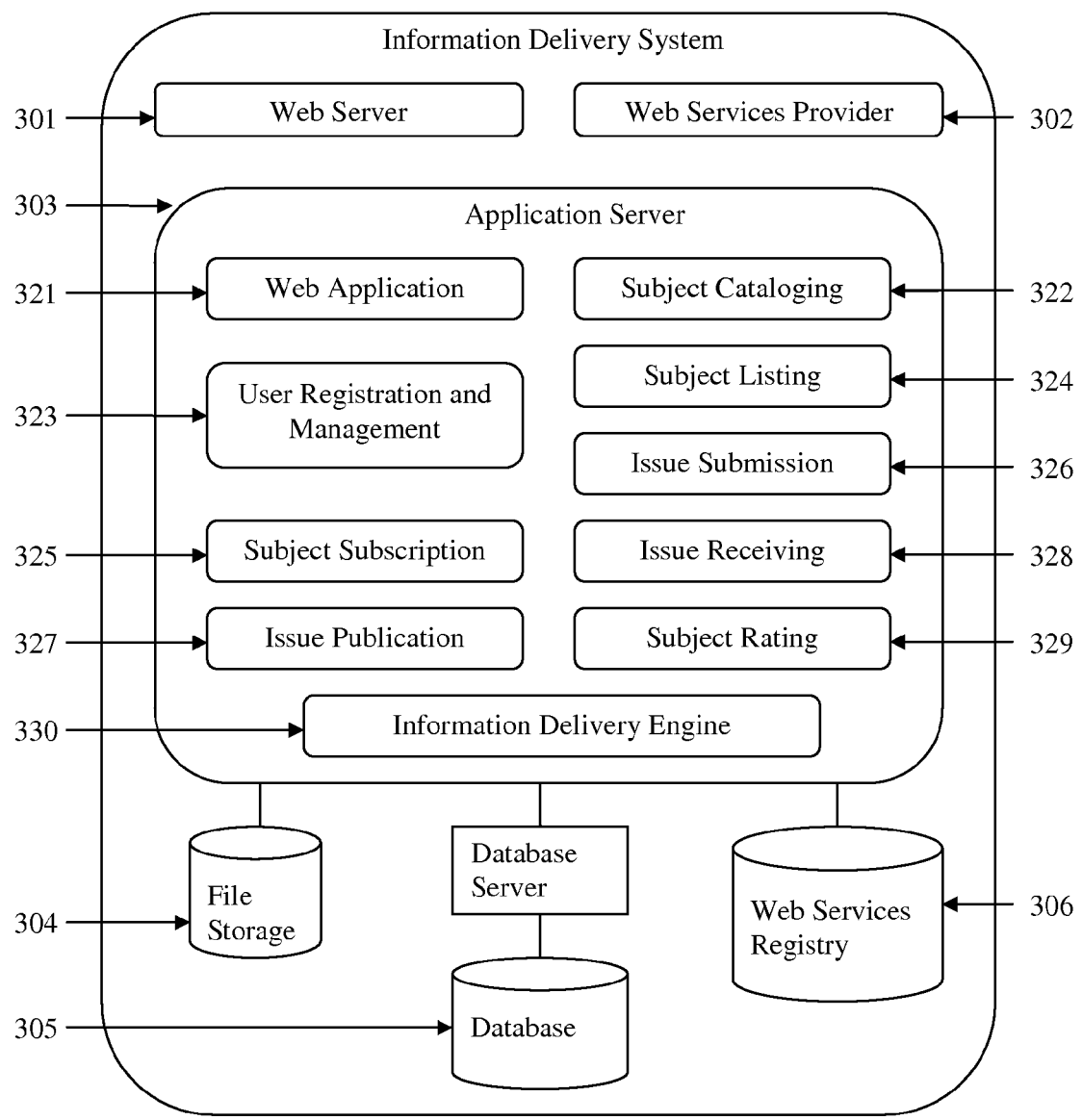
FIG. 3 illustrates an embodiment of the system of the invention, including its major software components.

The major software components of the system 100 of the invention are illustrated in FIG. 3. These components include web server 301, web services provider 302, application server 303, file storage 304, database server and database 305, and web services registry 306.

While shown in FIG. 3 as a standalone component, the web services provider component may reside in the web server 301 and reuse existing functionality realized by the web server 301 and/or the application server 302. The web services provider 302 implements all the exposed web services and provides an access endpoint for these services. By providing an alternative, programmatic way to access the system, this component allows a web services client to send web services requests such as listing a subject and submitting an issue and to receive the corresponding responses.

The web server 301 illustrated in FIG. 3 filters all HTTP requests. It maintains and serves all static Hypertext Markup Language/Extensible Hypertext Markup Language ("HTML/XHTML") data and delegates all dynamic requests to the application server 303. The application server 303, on the other hand, houses the core software components 321-330 of the system. Among other things, the application server 303 provides persistence, transaction, and security support for the system.

As illustrated in FIG. 3, the application server 303 includes web application component 321, subject cataloging component 322, user registration and management component 323, subject listing component 324, subject subscription component 325, issue submission component 326, issue publication component 327, issue receiving component 328, subject rating component 329, and information delivery engine 330.

The web application component 321 manages a user's interactive session with the system 100. The web application component 321 determines the type of action requested by the user. It validates the user request and, based on the type of action requested by the user, the web application component 321 invokes the other relevant software components 322-330 of the system 100. For example, if the action requested by the user consists of listing an information subject in the subject category, the web application component 321 passes the request to the subject listing component 324. Similarly, if the user wants to subscribe to an information subject the web application component 321 invokes the subject subscription component 325.

The subject cataloging component 322 maintains the subject catalog and manages the cataloging and categorization of information subjects.

Figure 4:
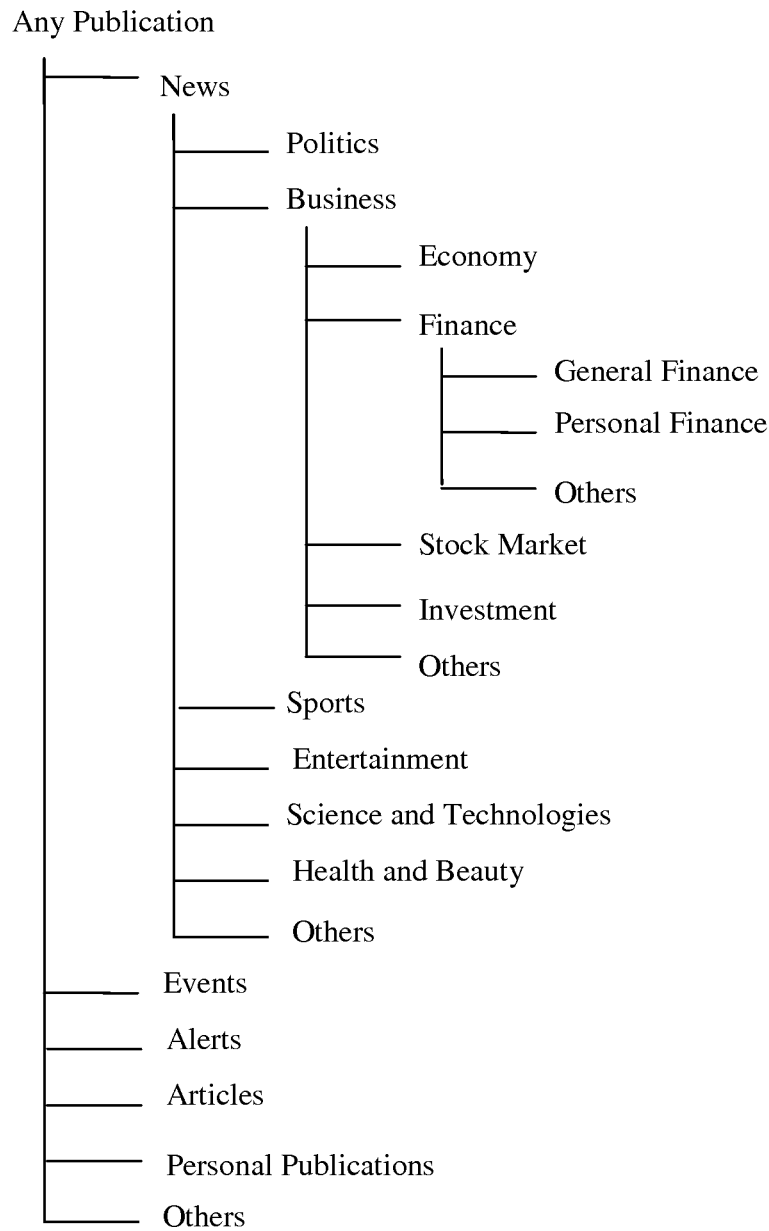
FIG. 4 illustrates a hierarchy of categories for subjects listed in the subject catalog of the invented system.

As illustrated in FIG. 4, the subject catalog contains a hierarchy of predefined categories, each of which may contain sub-categories. The root of the hierarchy is "Any Publication", which doesn't belong to any other category. Under the root category, there are a few main categories such as "News", "Events", "Alerts", "Articles", "Personal Publications", etc. Each of these categories forms a sub-hierarchy. For example, "News" contains sub-categories such as "Politics", "Business", "Sports", "Entertainment", "Science & Technologies", "Healthy & Beauty", and so on. The "Business" sub-category further contains "Economy", "Finance", "Stock Market", "Investment", and so on.

A category that doesn't contain any sub-categories is a leaf category. For example, "Economy", "Finance", "Stock Market" and "Investment" in FIG. 4 don't have sub-categories and are therefore leaf categories.

Note that the FIG. 4 only demonstrates a partial category tree due to the space limit. Also, the hierarch may be extended as needed by introducing sub-categories to a leaf category and adding more sub-categories to a non-leaf category.

For a non-leaf category, one of the sub-categories is "Others", which is a special category for subjects that are not suitable for any other sub-categories at the same level. "Others" category is always a leaf category.

Only leaf category may list information subjects. Therefore, a leaf category contains a class of the information subjects that have certain common attribute that the category manifests. When a leaf category is promoted a non-leaf category (by introducing sub-categories), all the subjects listed in the category will be moved to "Others" sub-category.

Categorization is subjective and FIG. 4 only demonstrates one of the possibilities. Based on different criteria used for categorization, a different category hierarchy can be formed. For instance, "News" might be divided to "Local News", "Domestic News", and "International News", etc.

The categories, the information subjects listed in the category hierarchy, and the relationships between the categories are managed by the subject cataloging component 322 and stored in the system database 305. With the subject cataloging component 322, system administrators can manage the catalog such as creating a new category and promoting, modifying or removing an existing category. More importantly, the component provides users with the functionality of browsing and searching the catalog.

A user can browse the categories and the subjects listed in the categories. To support browsing, the subject cataloging component 322 can return the subjects directly listed in a given leaf category or combined subjects listed in all leaf categories under a given non-leaf category. The returned subjects can be further categorized by subject properties such as publisher, publication schedule, available versions, popularity, and rating for roll-up and drill-down. Besides browsing, navigation is also supported. For instance, a user can navigate from one subject to other subjects listed by the same publisher, or from one subject to other similar subjects.

The cataloging component 322 also contains indexing and searching capabilities, providing an alternative way other than browsing to locate a subject or a category. Indexing and searching can be extended beyond category names and subject names to subject attributes such as publisher, subject description, and sample issues. With the indexing and search capabilities, the component is able to return a list of plausible categories for a given search query entered by a publisher, typically a subject name, so that the right category can be identified to list a subject. The component can also return a list of candidate subjects for a given search query entered by a subscriber, typically keywords, so that the subscriber can identify interesting subjects.

The search can be conducted in the whole subject catalog or selectively in certain categories in the catalog.

The user registration and management component 323 manages all user-related activities or actions in the system and maintains its users (both publishers and subscribers) in the database. The component is responsible for user registration, user account creation, updating, and cancellation, user authentication, system security, user privacy protection, and so on.

To register with the system, a user needs to provide required user registration information such as user first name and last name, address, email address, phone numbers, username, password, etc. A user can also decide whether to keep an optional public profile that contains the username and other public information such as interest and profession. A public profile can be viewed and searched by any user.

With the user registration and management component 323, a registered user can also create a new user group, add new members to or remove existing members from an existing user group, or remove an existing group. To add a member to a user group, the member's identification (username) needs to be known. One way to get the identification is to search or browse users who have public profiles. A user can add one user group as a member to another group, meaning that all members in the former group will be also the members of the latter group.

The subject listing component 324 enables a publisher to list information subjects in the subject catalog. Interacting with this component, a publisher can create new listings, view, modify, and delete existing listings.

To list a new subject, a publisher provides all information about the listing, including subject name, description, target category, subscription fee, user groups, subscription agreement, sample issue(s), publication schedule, available versions, etc.

A publisher can control who may view or subscribe to a subject listing by designating it to one or more user groups. Only the members in those user groups may view and subscribe to the subject listing. If the default user group "Everyone" is selected, any user in the system may view or subscribe to the subject.

In addition, a subject listing specifies how to handle past issues. The past issue handling defines whether to keep previously published issues available for future subscribers and if so for how long (including forever) these past issues will be kept.

Though unessential, a publisher can view the subscriptions for each of his/her subject listings. Further for each subscription, the publisher may view the subscription information such as the selected version.

Deleting or modifying a subject listing in a way that impacts existing subscriptions is not recommended unless such actions are allowed by the subscription agreement. Nevertheless, extra caution from publishers is necessitated.

The subject subscription component 325 allows a user to subscribe to subjects listed in the catalog. Interacting with this component, a user can make new subscriptions, view, modify, or cancel existing subscriptions.

In general, a subscriber browses or searches the subject catalog for interesting subjects to subscribe to. To subscribe to a subject, the subscriber provides all the subscription information including subject name, desired version, receiving schedule, delivery media, and so on. Depending on the selected media type, the subscription must also provide the destination information, such as an email address or a fax number.

The issue submission component 326 enables a publisher to submit to the system an issue for a subject that he/she lists so the issue can be published and delivered to the corresponding subscribers. It also allows the publisher to view a list of recently submitted issues, modify, delete, or replace submitted issues, etc.

To complete the submission of a new issue, the publisher should submit the issue in all versions specified by the subject listing. However, the publisher can submit one version at a time. When the system receives a submission, it will store the issue in its file storage 304.

For a submission, a new publication schedule can be optionally specified for the submitted version. By default, the publication schedule specified by the subject listing is used. If a new publication schedule is specified, it will override the default publication schedule for the submitted issue.

If the publication schedule for a submitted issue is real-time, the issue will be published immediately. If the publication schedule is on-demand, the system will not publish it until the publisher requests so. As the system allows a publisher to view a list of submitted issues, at a later time he/she can request the system to publish issues with an on-demand publication schedule. If the publication is scheduled at a future time, the system will publish the issue when the scheduled time arrives.

Before the system starts delivering a submitted issue, the publisher can modify a submitted issue such as re-submitting a new copy or providing a new publication schedule. He/She may also delete it so that he/she can summit a new one later.

In addition, a publisher is also able to view a list of issues that are due or overdue. The system may send reminders to the publisher and require actions for those issues.

The issue publication component 327 enables a publisher to view a list of submitted issues that have on-demand publication schedules and to request the system publish any of these issues. Once the request is received, the system will publish these requested issues.

The issue receiving component 328 enables a subscriber to view a list of mature issues for his/her subscriptions and the corresponding receiving schedules for those issues, to override the receiving schedule for a mature issue, or to request delivery of any mature issues for a subscription. In addition, the issue receiving component allows a subscriber to request redelivery of any missing delivered issues.

As described above, when a published issue is delivered to a subscriber is determined by the receiving schedule specified in the subscription. Thus, if the receiving schedule for a subscription is real-time, the subscriber doesn't need to make a request in order to receive the published issues: any issue published for the subscribed subject is delivered to the subscriber as soon as the issue is published. If the receiving schedule is fixed, the published issue will not be delivered to the subscriber until the scheduled time arrives. However, if the receiving schedule is on-demand, the subscriber must make a receiving request with the issue receiving component 328 in order to receive the published issue. Once the request is received, the system will deliver the issue to the subscriber.

Nevertheless, the above default receiving time for an issue derived from the receiving schedule specified for the subscription can be overridden and the overriding can happen as long as the issue hasn't been delivered. With the issue receiving component 328, the subscriber can make a request to override the derived receiving schedule for a mature issue by specifying a new receiving schedule for the issue. For instance, if for a mature issue the receiving time derived from the receiving schedule specified by the subscription is a fixed time in the future, the subscriber may request an immediate delivery of the issue, re-schedule the delivery for a different time, or change the receiving schedule to on-demand so that the subscriber can request the delivery of the issue later. Similarly, if the receiving schedule for a mature issue is on-demand or real-time, the subscriber can override the receiving schedule with a fixed time in the future.

Such an overriding only applies to the specific issue. It has no impact on subsequent issues.

A subscriber may also cancel a pending delivery so as not to receive the issue at all, in cases such as the issue is too old or not in need any more.

The subject rating component 329 allows a subscriber to provide his/her opinion of the quality of the issues published for a subject rendered by the publisher. The rating for a subject includes an overall score and some detailed comments. Based on all the ratings provided by subscribers for a subject, an overall rating is determined and flagged for the subject.

Figure 5:
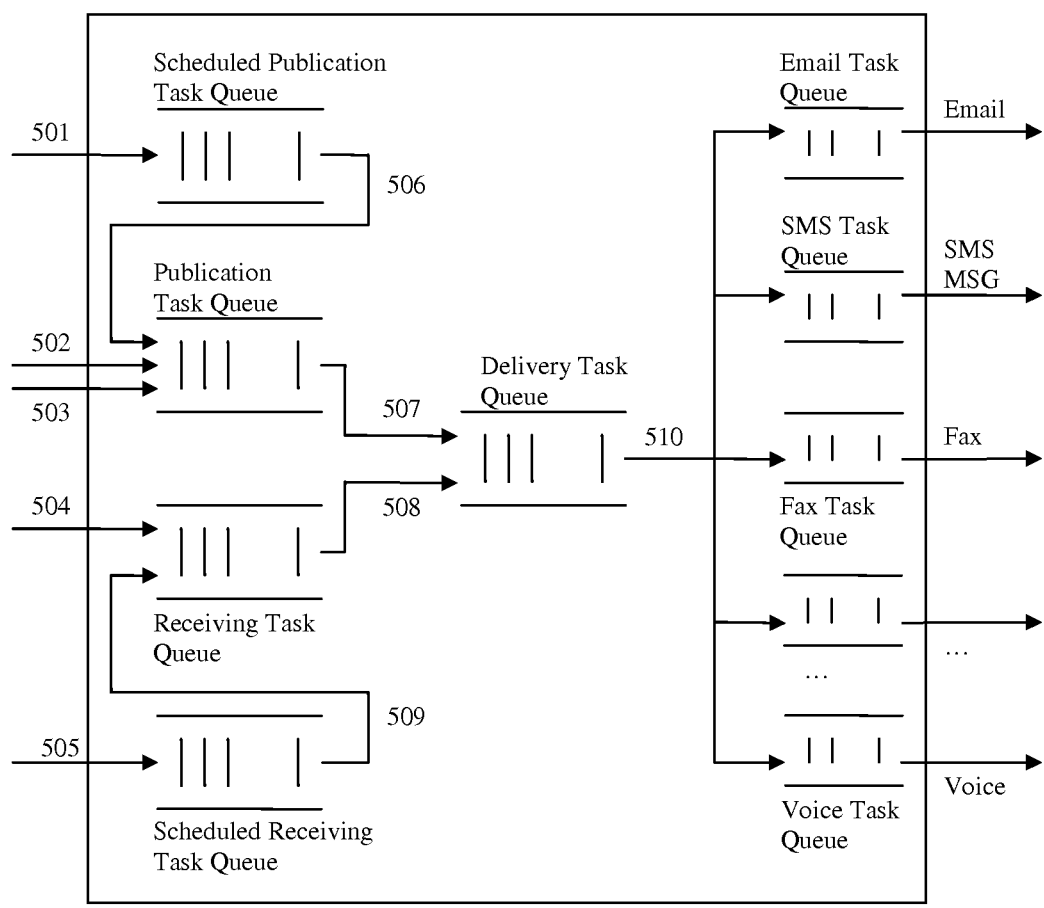
FIG. 5 illustrates a workflow diagram of the information delivery engine of the invented system.

The information delivery engine component 330 delivers published issues to the corresponding subscribers according to the subject listings and the subscriptions such as the publication schedule, receiving schedule, delivery media, and selected issue version. The engine doesn't interact with user directly. Instead, it performs tasks created by other components in the application server 303. FIG. 5 illustrates a workflow diagram of the information delivery engine, in which a solid arrow represents an information transformation process identified by a number.

A scheduled publication task is created [501] from the issue submission component 326 when a publisher submits an issue for publication with a fixed publication schedule. The delivery engine creates a timer based on the schedule to execute the scheduled publication task. When the timeout occurs, the engine transforms [506] the task into a publication task.

A publication task can also come directly from the issue submission component 326 when a publisher submits an issue with a real-time publication schedule [502] or from the issue publication component 327 when a publisher requests to publish a previously submitted issue with an on-demand publication schedule [503].

For each publication task, the delivery engine 330 queries the database for all subscriptions. If a subscription specifies a real-time receiving schedule, a delivery task will be created [507] and put into the delivery task queue. However, if the receiving schedule for a subscription is either on-demand or fixed, the delivery engine 330 marks the issue as mature to be delivered for the subscription in the database without creating a delivery task.

Based on the selected version and delivery media specified in the subscription, a delivery task will be routed [510] into different task queues such as email task queue for the final delivery.

Delivery tasks can be also created if a subscription has a fixed or on-demand receiving schedule. When a subscriber makes a subscription with a fixed receiving schedule, a scheduled receiving task is created [505]. Similar to a scheduled publication task, a timer is set based on the receiving schedule. When timeout occurs, the task will be transformed into a receiving task [509]. If the schedule is recurrent, a new scheduled receiving task will be created for the next receiving.

A receiving task can also be directly created [504] by the issue receiving component 328 when a subscriber explicitly requests the delivery of a mature issue with an on-demand receiving schedule.

When the delivery engine executes a receiving task for a subscription, it queries the database for all mature issues and then creates corresponding delivery tasks [508].

FIG. 5 illustrates a simplified workflow diagram of the information delivery engine. In reality, it's desirable to have priorities assigned to different delivery tasks. For example, subscription with a real-time receiving schedule demands a higher delivery priority than does a subscription with an on-demand receiving schedule. In this case, there can be multiple delivery task queues, each queue having a different delivery priority. Also, for a task queue, there can be one or more serving threads.

Besides adding a task into a task queue, the system can also remove a task from a queue. For instance, if a subscriber cancel or modify a receiving schedule for an issue, the scheduled receiving task will be canceled or replaced.

File storage 304 is used for storing issues that is submitted by publishers. It is also used for data archiving, run-time caching, and storing temporary system data.

The database server and database 305 are used to store system information such as user registrations, subject catalog, subjects, subscriptions, issue submissions, publication requests, receiving requests, publication status, receiving status, etc. By querying the database, the system can find out information such as what subjects a given user lists or subscribes to, for each subject who's the publisher and who are the subscribers, etc. The metadata stored in the database is used by the other components and predominantly, the information delivery engine 330.

Web services registry 306 is the directory housing the definitions of web services exposed by the system. The registry contains metadata for a service embodied within a web services description document. The web services registry 306 can be a public registry or a proprietary one (possibly, part of the information delivery system).

Figure 6:
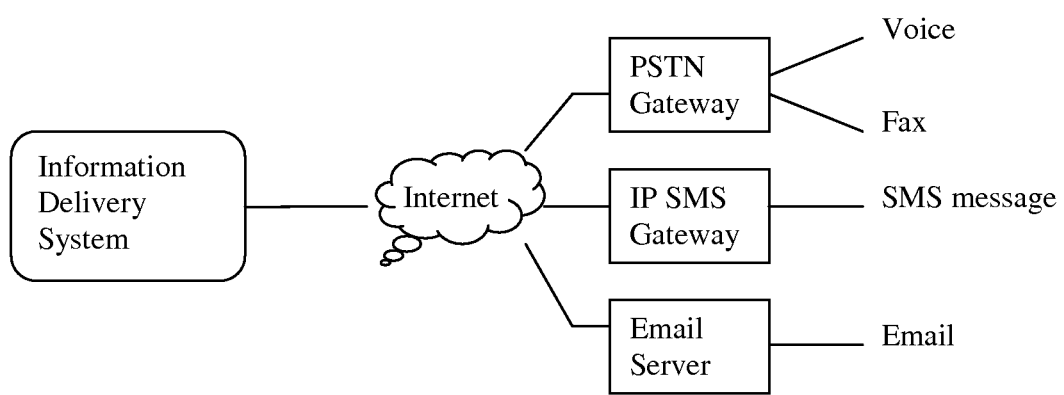
FIG. 6 illustrates the external systems that the invented system interacts with to complete information delivery tasks.

FIG. 3 doesn't show the external systems that the deliver engine interacts with to deliver issues. FIG. 6 illustrates those external systems such as email server, PSTN gateway, IP SMS gateway, etc. The delivery engine has client interfaces to communicate with these systems for issue delivery.

The above description depicts only the major components in the system of the present invention, especially those subsystems directly interacting with the user. Depending on the magnitude of implementation and extensional needs, additional functional components such as shopping cart component, payment processing component, billing component, system configuration and administration component, and advertising component may be included in the system. Extra functionality may be incorporated into the existing components. For example, the user registration and management component may allow a user to customize the web interface or set default settings based on his/her preference.

Use Cases:

A series of use cases will now be described with reference to FIG. 7-12 in order to explain the operation of the system 100. In particular, operation of the system 100 when a publisher makes the following requests is described:

List Subject
Summit Issue
Publish Issue as well as when a subscriber makes the following requests:
Subscribe to Subject
Receive Issue.

Figure 7:
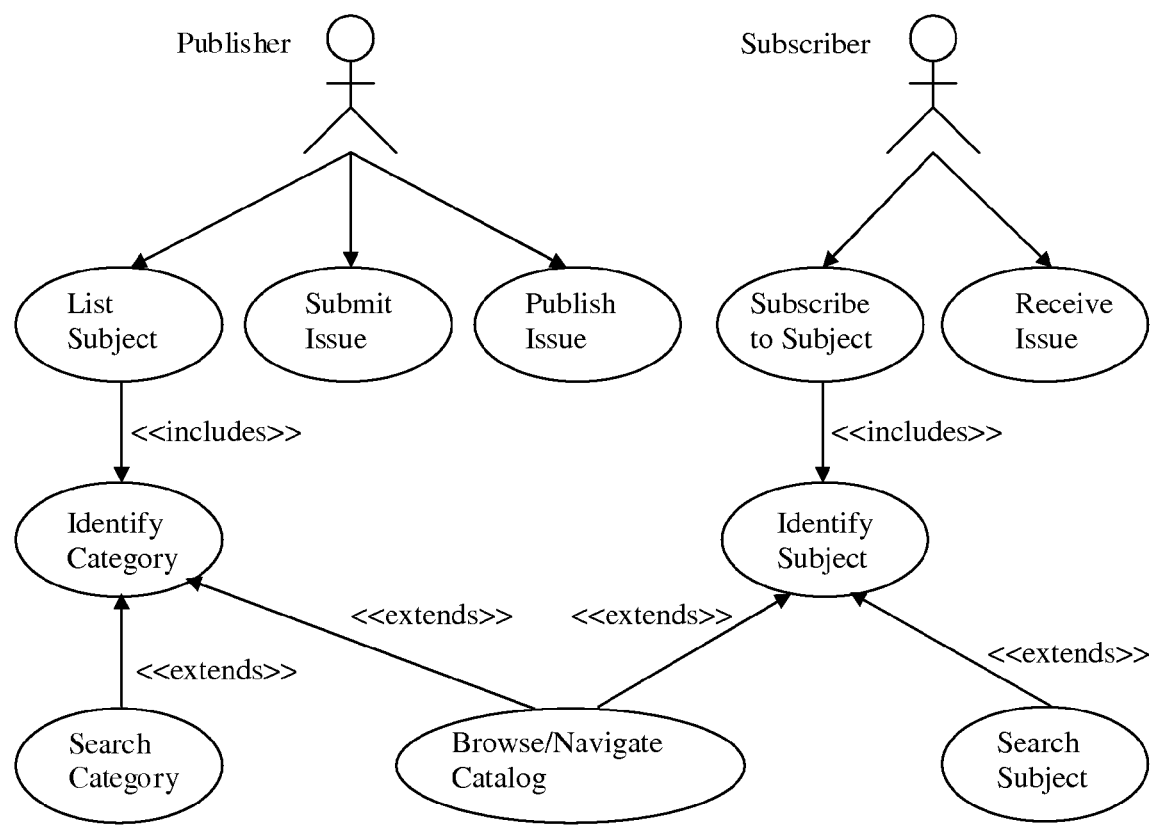
FIG. 7 illustrates the use cases of the system software loaded on the system server of the invention.

As shown in FIG. 7, the List Subject use case of the publisher includes the Identify Category use case. The Identify Category use case takes effect when the publisher starts to list a subject. Similarly, the Subscribe to Subject use case of the subscriber includes the Identify Subject use case. The Identify Subject use case takes effect when the subscriber starts to subscribe to a subject.

The Identify Category use case is extended by the Search Category use case and the Browse/Navigate Catalog use case. The publisher identifies a category to list a subject by either searching the catalog for a category with a given subject name or browsing the catalog to locate a category. Similarly, the Identify Subject use case is extended by the Search Subject use case and the Browse/Navigate Catalog use case. The subscriber identifies a subject by either searching the catalog for an interesting subject with a given keyword query or browsing/navigating the catalog to locate an interesting subject.

The Browse/Navigate Catalog use case is further extended by each of the following scenarios:

- for a queried leaf category, the system returns subjects listed in it;
- for a queried non-leaf category, the system returns all its sub-categories;
- for a queried category, the system returns all its sub-categories and/or all subjects listed in the category hierarchy;
- for a queried subject, the system returns the category in which the subject is listed;
- for a queried category, the system returns the parent category (if exists);
- for a queried subject, the system returns its publisher;
- for a queried publisher, the system returns all subjects listed by him/her;
- for a queried subject, the system returns a list of other subjects listed by the same publisher; and
- for a queried subject, the system returns a list of similar subjects.

Figure 8:
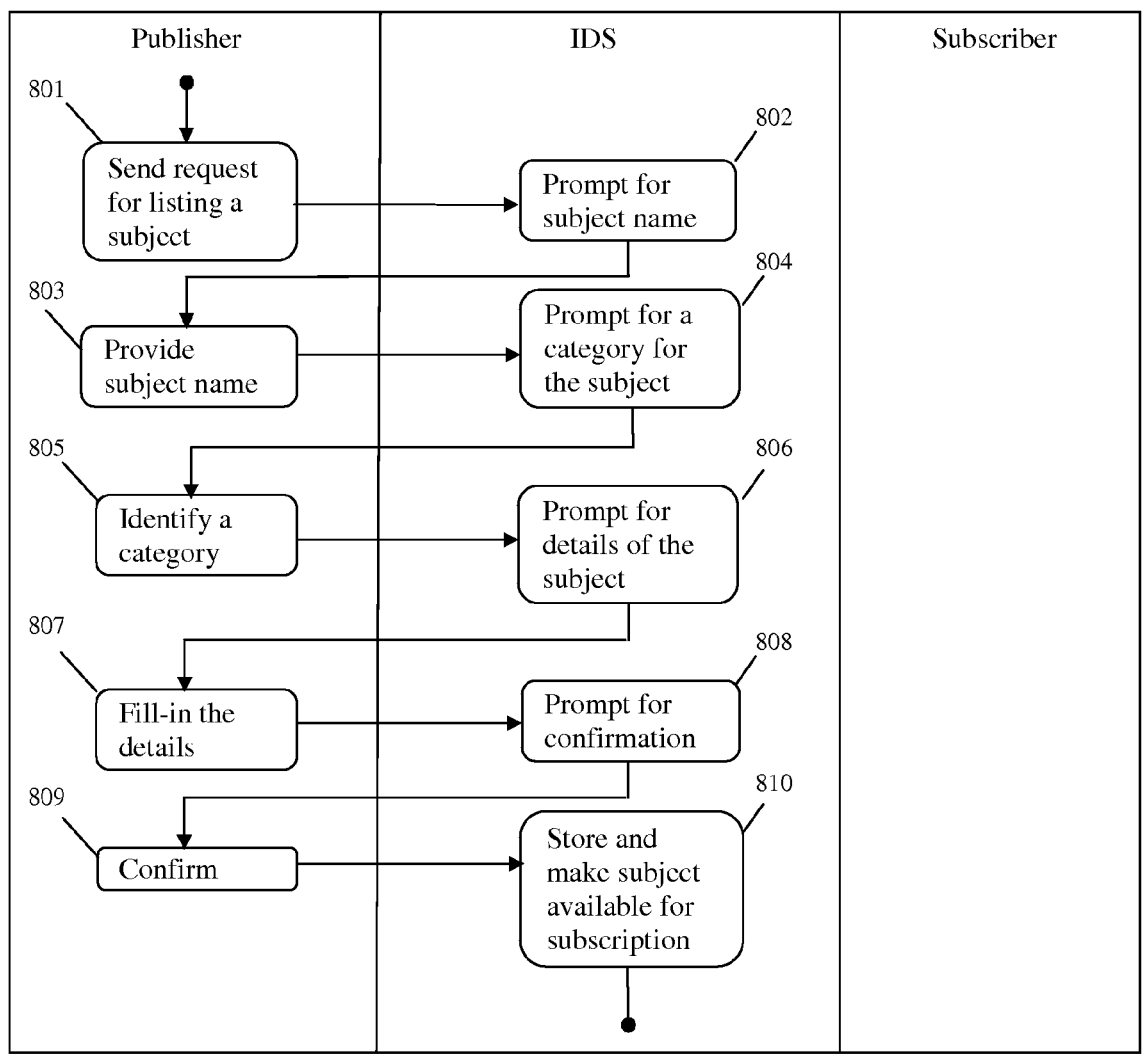
FIG. 8 illustrates the List Subject use case.

FIG. 8 illustrates the List Subject use case in terms of a sequence of interactions when a publisher lists an information subject in the system:

[801] a publisher seeking to publish information sends a request to the system for listing information subject;
[802] in response, the system prompts for the name of the subject;
[803] the publisher provides a subject name to the system;
[804] as a response, the system prompts for the category in which the subject is to be listed and possibly provides a list of candidate categories for the publisher to select;
[805] the publisher identifies a category, selecting one of the candidate categories or a different category by browsing/navigating the catalog hierarchy;
[806] the system prompts for details about the subject such as description, publication schedule, available versions, handling of past issues, subscription price, sample issue, and so on;
[807] the publisher fills-in the required details and sends them back to the system;
[808] after received all required information, the system then prompt for final confirmation from the publisher;
[809] the publisher confirms the listing; and finally,
[810] the system stores the subject in the database and lists it in the designated category in the subject catalog so as to make it available for potential subscribers to search, browse, or subscribe to.

It's also possible that the publisher first identifies a category and then sends a request for listing a subject in the identified category. Such a variation only changes the sequence of steps [801] to [805].

Figure 9:
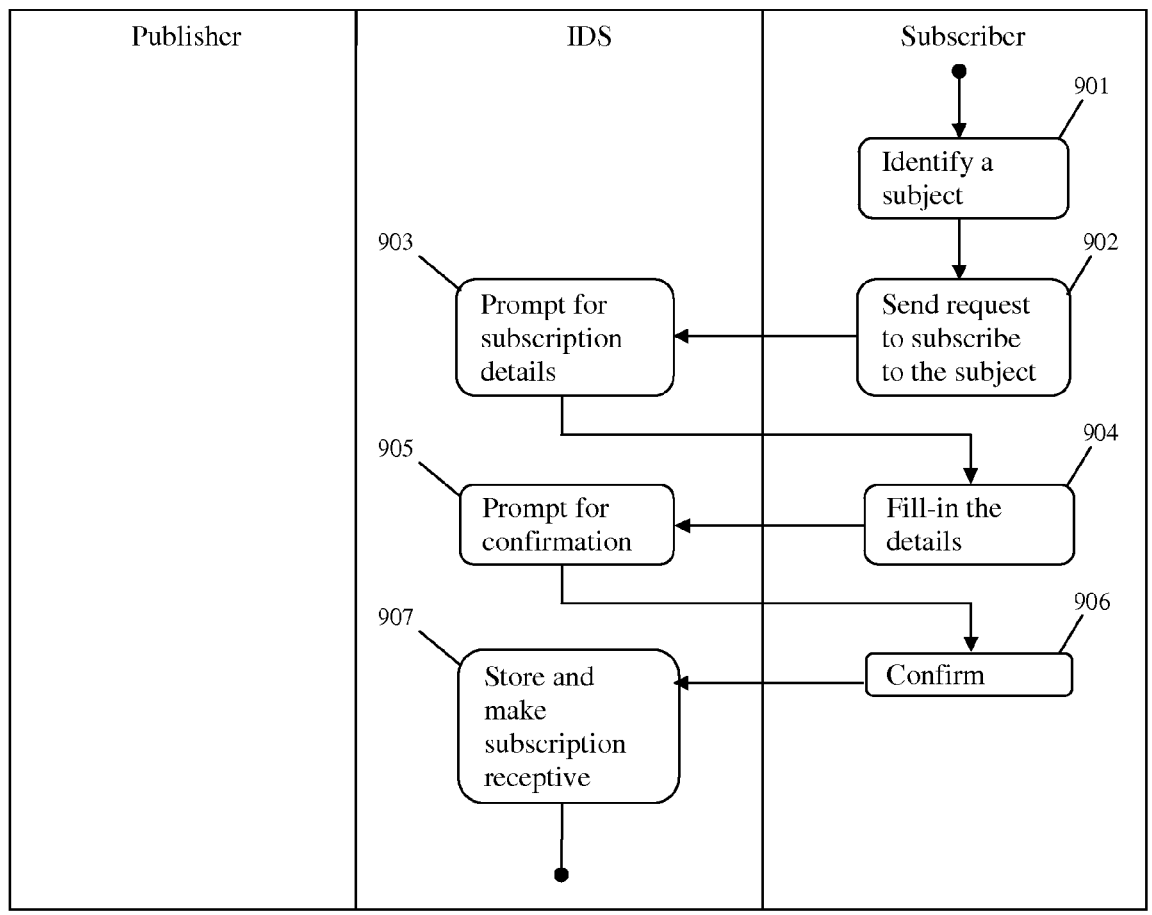
FIG. 9 illustrates the Subscribe to Subject use case.

FIG. 9 illustrates the Subscribe to Subject use case where a subscriber makes a subscription to a subject listed in the subject catalog:

[901] a subscriber identifies a subject interesting to him/her by searching or browsing/navigating the catalog;
[902] the subscriber sends a request for subscribing to the identified subject;
[903] the system prompts for subscription details such as desired version, delivery media, and receiving schedule;
[904] the subscriber fills-in the required information about the subscription and submits it to the system;
[905] the system prompts for subscription confirmation from the subscriber;
[906] the subscriber confirms the subscription; and finally,
[907] the system stores the subscription in the database and makes the subscription receptive for published issues for the subject.

Figure 10:
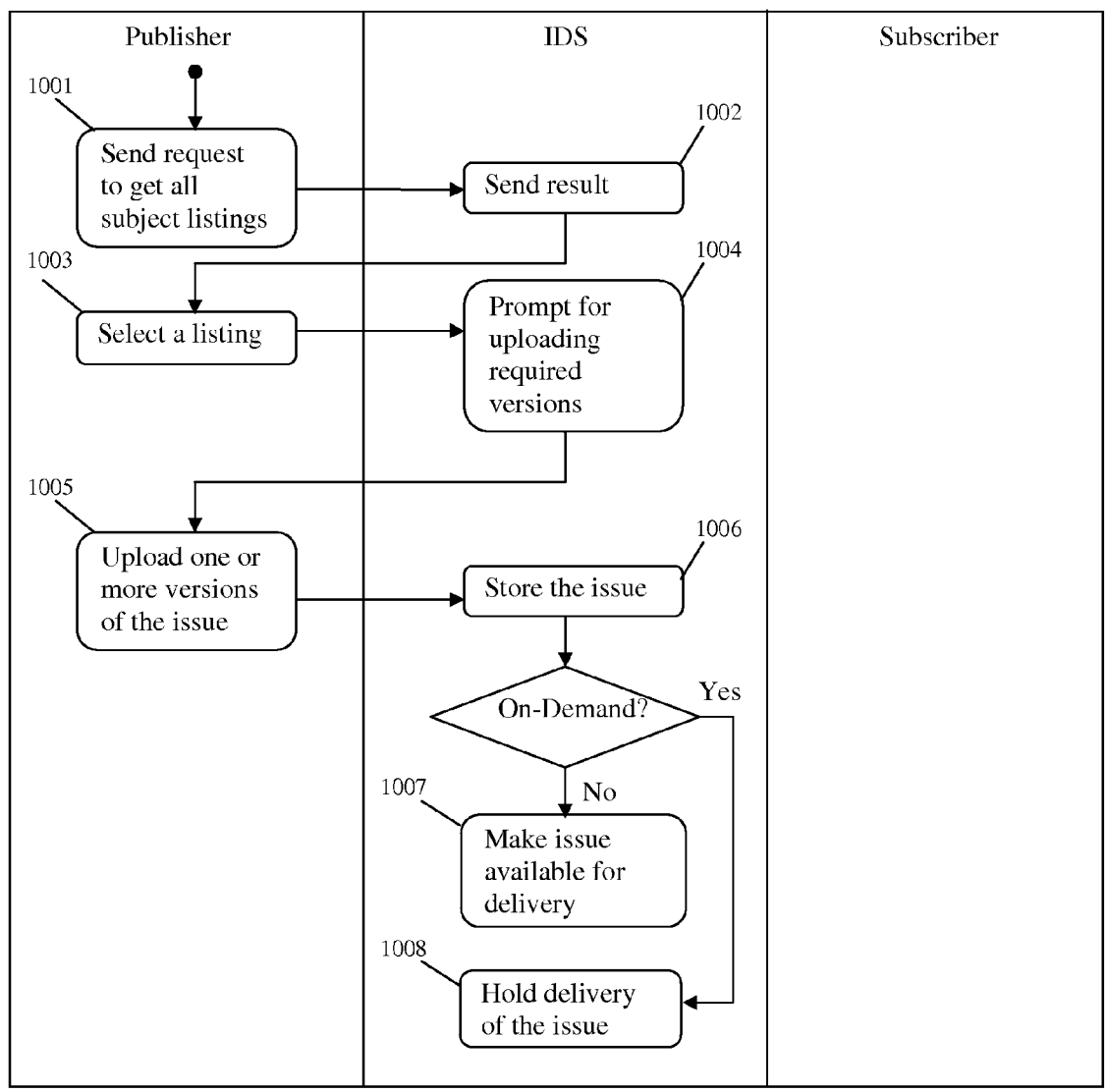
FIG. 10 illustrates the Submit Issue use case.

FIG. 10 illustrates the Submit Issue use case where a publisher summits to the system an issue for a subject listed by him/her:

[1001] a publisher requests a list of subject listings created by him/her;
[1002] in response, the system returns the publisher's subject listings;
[1003] the publisher selects a subject listing for which he/she wants to summit an issue;
[1004] the system prompts for uploading the issue in versions specified by the subject listing;
[1005] the publisher uploads one or more versions of the issue;
[1006] the system stores each of the uploaded versions of the issue in the file storage and updates the system database accordingly;
[1007] if the publication schedule of the subject listing is not on-demand, the system makes the submitted issue available for publication;
[1008] Otherwise, the system holds the publication of the submitted issue until the subscriber sends an issue publication request.

Figure 11:
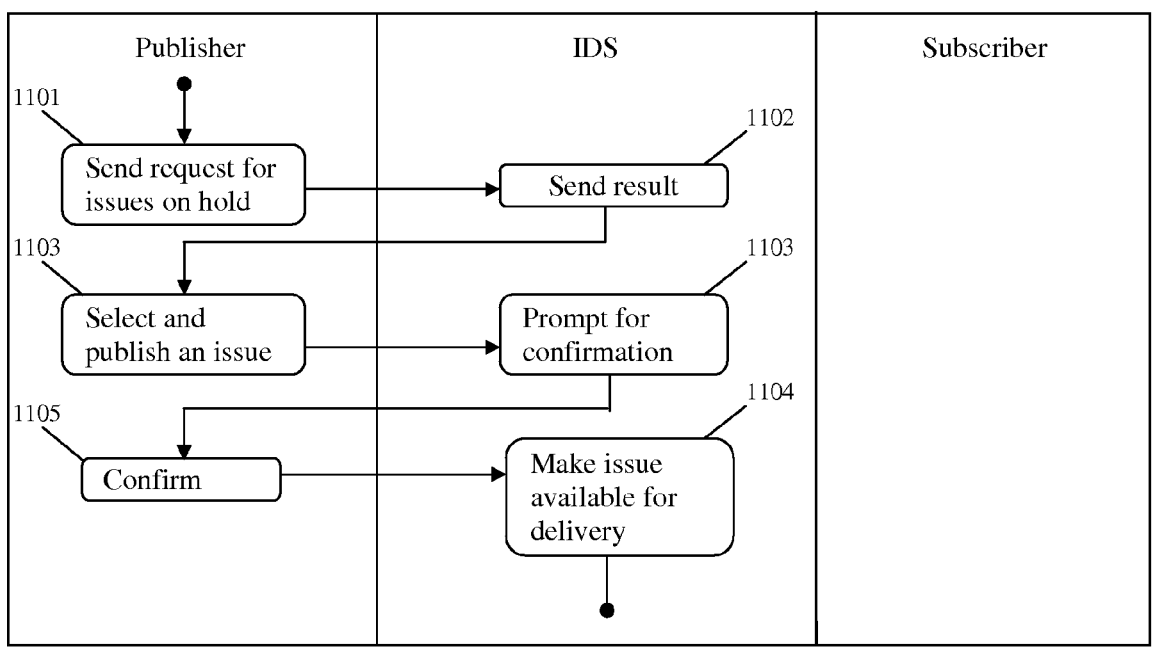
FIG. 11 illustrates the Publish Issue use case.

FIG. 11 illustrates the Publish Issue use case where a publisher requests the system publish an issue that has been previously submitted for a subject whose publication schedule is on-demand:

[1101] the publisher sends a request to the system for a list of issues that have been submitted previously but not yet published because of an on-demand publication schedule;
[1102] in response, the system returns a list of issues that satisfy the condition;
[1103] the publisher selects an issue and requests that the system publish it;
[1104] the system prompts for publication confirmation;
[1105] the publisher confirms the publication; and finally,
[1106] the system updates the database and makes the issue available for delivery.

Figure 12:
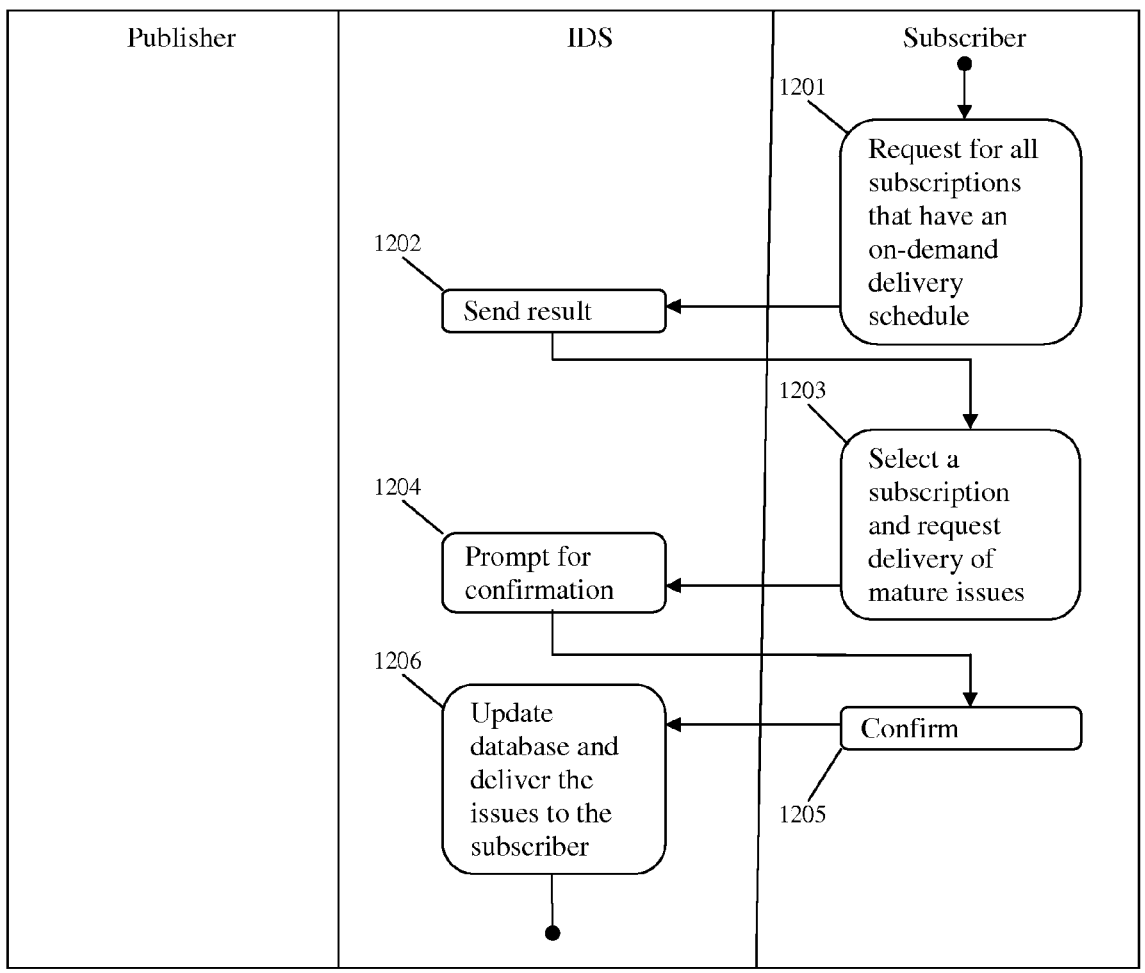
FIG. 12 illustrates the Receive Issue use case.

FIG. 12 illustrates Receive Issue use case where a subscriber requests the system deliver the mature issues for one of his/her subscriptions that have an on-demand receiving schedule:

[1201] a subscriber sends a request for a list of his/her subscriptions that have an on-demand receiving schedule;
[1202] in response, the system returns a list of subscriptions that the subscriber has made with an on-demand receiving schedule;
[1203] the subscriber selects a subscription and makes a request for delivery of any mature issues for the subscription;
[1204] the system prompts for confirmation of the request;
[1205] the subscriber confirms the request; and finally,
[1206] the system updates the database and delivers the issues to the subscriber.

It's apparent that the above request is unnecessary for a subscription whose receiving schedule is not on-demand.

While the above descriptions of the use cases are based on an interactive web client, these use cases are applied similarly to wireless clients. However, these use cases don't apply for a web services client because a web services client invokes a request programmatically rather than interactively.

Although the above use cases don't specify, a request is cancelled when the user doesn't provide confirmation when prompted by the system.

From the above description, it should be readily apparent that numerous other modifications and combinations of the above disclosure may be made without departing from the scope of the present invention. For example, while web services are used to access the information delivery system in the invention, those skilled in the art will appreciate that such an approach is not necessary. Further, the processes described herein are intended as specific implementations only and are not intended to delimit the scope of the invention, which should instead be understood with reference to the following claims.

What is claimed is:

1. In a computer network comprising a system implemented on Intranet or Internet via one or more types of user interfaces such as web-based interfaces and web services, a method for delivering information published by information publishers to information subscribers, comprising the steps of:
   receiving from a plurality of information publishers and subscribers registration data and storing the registration data in a database coupled to the system;
   providing an online subject catalog to categorize and store information subjects, the online subject catalog comprising a hierarchy of predefined categories;
   receiving from information publishers one or more subject listings and storing the received subject listings in the online subject catalog, each of the subject listings being available for publishing one or more issues;
   receiving from information subscribers subscriptions to the desired information subjects listed in the online subject catalog;
   receiving issues submitted by information publishers, each of the issues being published for an information subject listed by the respective publisher who submits the issue;
   delivering each of the issues to each information subscriber who has made subscription to the information subject that the issue is published for, wherein said each information subscriber continues to receive newly published issues as long as said each information subscriber's subscription is valid, and
   executing one or more commands from the publisher of a subject listing to specify whether past issues for the subject listing are kept for future subscribers of the subject listing and how long the past issues are kept if past issues for the subject listing are kept.

2. The method of claim 1, wherein only leaf categories may contain subject listings.

3. The method of claim 1, further comprising the steps of:
   executing one or more commands from a publisher to find a category in the subject catalog so as to list an information subject in the category; and
   executing one or more commands from a subscriber to find a desired subject listing in the subject catalog so as to subscribe to the subject listing.

4. The method of claim 3, wherein the step of executing one or more commands from a publisher to find a category comprises the steps of:
   executing one or more commands from the publisher to browse the subject catalog;
   providing an user interface via which the publisher browses or navigates in the subject catalog;
   providing a plurality of candidate categories of the online subject catalog based on a name of the information subject; and
   fulfilling the publisher's query given by a plurality of keywords for desired categories in the catalog.

5. The method of claim 3, wherein the step of executing one or more commands from a subscriber to find a desired subject listing comprises the steps of:
   providing a user interface via which the subscriber browses or navigates in the online subject catalog;
   fulfilling the subscriber's query given by a plurality of keywords for desired subject listings in the subject catalog;
   providing a user interface via which the subscriber navigates in the subject catalog from one subject listing to other subject listings created by the same publisher; and
   providing a user interface via which the subscriber navigates in the subject catalog from one subject listing to other similar subject listings.

6. In a computer network comprising a system implemented on Intranet or Internet via one or more types of user interfaces such as web-based interfaces and web services, a method for delivering information published by information publishers to information subscribers, comprising the steps of:
   receiving from a plurality of information publishers and subscribers registration data and storing the registration data in a database coupled to the system;
   providing an online subject catalog to categorize and store information subjects, the online subject catalog comprising a hierarchy of predefined categories;
   receiving from information publishers subject listings and storing the subject listings in the online subject catalog, each of the subject listings being available for publishing one or more issues;
   receiving from information subscribers subscriptions to the desired information subjects listed in the online subject catalog;
   receiving issues submitted by information publishers, each of the issues being published for an information subject listed by the respective publisher who submits the issue;
   delivering each of the issues to each information subscriber who has made subscription to the information subject that the issue is published for; and
   executing one or more commands from the publisher of a subject listing to specify whether past issues for the subject listing are kept for future subscribers of the subject listing and how long the past issues are kept if past issues for the subject listing are kept.

7. The method of claim 1, further comprising the steps of:
   executing one or more commands from the publisher of a subject listing to specify for the subject listing a real-time, on-demand, or fixed publication schedule;
   executing one or more commands from the publisher to specify for the subject listing a publication time, a recurrence pattern, and a range of recurrence if the subject listing has a fixed publication schedule and if multiple issues are to be published for the subject listing; and
   publishing an issue submitted by the publisher for the subject listing according to the publication schedule specified for the subject listing.

8. The method of claim 1, further comprising the steps of:
   executing one or more commands from the publisher of a subject listing to specify for the subject listing one or more versions in which the issues published for the subject listing are made available; and
   executing one or more commands from the subscriber of a subscription to select for the subscription a desired version of the issues for the subject listing that the subscription is made to.

9. The method of claim 1, further comprising the step of:
executing one or more commands from the subscriber of a subscription to select for the subscription a delivery media with corresponding destination information.

10. The method of claim 1, further comprising the steps of:
executing one or more commands from the subscriber of a subscription to specify for the subscription any of: a real-time, on-demand, and fixed receiving schedule;
executing one or more commands from the subscriber to specify for the subscription a receiving time, a recurrence pattern, and a range of recurrence if the subscription has a fixed receiving schedule and multiple issues are to be received for the subscription; and
delivering to the subscriber the published issues for the subscription according to the receiving schedule specified for the subscription.

11. The method of claim 1, further comprising the steps of:
executing one or more commands from the publisher of a subject listing to publish an issue that is submitted previously by the publisher for the subject listing if the subject listing has an on-demand publication schedule; and
executing one or more commands from the subscriber of a subscription to request the system deliver to the subscriber the mature issues for the subscription if the subscription has an on-demand receiving schedule.

12. The method of claim 1, further comprising the step of:
executing one or more commands from a user to create a plurality of user groups.

13. The method of claim 1, further comprising the step of:
executing one or more commands from the publisher of a subject listing to specify for the subject listing one or more user groups created by the publisher, only whose members may view or subscribe to the subject listing.

14. The method according to claim 1, further comprising the steps of:
executing one or more commands from a publisher to override the publication schedule of an issue submitted by the publisher before the issue is published; and
executing one or more commands from the subscriber of a subscription to override the receiving schedule of a mature issue for the subscription before the issue is delivered to the subscriber.

15. The method of claim 1, further comprising the steps of:
providing an interface through which a subscriber may rate a subject listing that the subscriber has subscribed to; and
providing an overall rating for a subject listing based on the ratings received for the subject listing from the subscribers of the subject listing.

16. A computer system configured to deliver information published by information publishers to information subscribers, comprising:
a web server computer connected via at least one gateway to the Internet and configured to receive data from a plurality of information publishers via at least one of a plurality of communications devices, the data from the publishers including user registration data, subject listings, and subsequently published issues for the subject listings, and data from a plurality of information subscribers via at least one of a plurality of communication devices, the data from the subscribers including user registration data and subscriptions to subject listings;
a subject catalog that comprises a hierarchy of categories, each category comprising sub-categories or subject listings;
a database coupled to the server computer that stores and maintains comprehensive registration for the publishers, the subscribers, the subject catalog, and the system transactional data, the transactional data comprising requests for subject listing, issue submission, issue publication, subject subscription, and issue receiving, and status of issue submission, publication, and delivery;
a file storage that stores issues submitted by the publishers; and
an application server computer programmed to execute one or more commands from a publisher to browse or search the subject catalog to identify a category for listing an information subject, to list the information subjects in the catalog, to execute one or more commands from a subscriber to browse or search the catalog for a desired subject listing and make subscription to the subject listing, to receive an issue submitted by the publisher for the subject listing that the publisher creates, and to deliver the issue to the subscribers who have made subscriptions to the subjects for which the issue is published, wherein said application server computer executes one or more commands from the publisher of a subject listing to specify whether past issues for the subject listing are kept for future subscribers of the subject listing and how long the past issues are kept if past issues for the subject listing are kept.

17. The system of claim 16, wherein the application server is further programmed to execute one or more commands from a publisher to publish a submitted issue if the issue is submitted for a subject that has an on-demand publication schedule.

18. The system of claim 16, wherein the application server is further programmed to execute one or more commands from a subscriber of a subscription to specifically request the delivery of the mature issues for the subscription if the subscription to the subject listing has an on-demand receiving schedule.

19. The system of claim 16, further comprises a web service provider component for executing commands from the publishers and subscribers of the system to programmatically access the system using web service clients.

20. The system of claim 16, further comprising a web service registry that provides the definitions of the web services exposed by the system.

21. The system of claim 16, wherein the application server further comprises components for user registration and management, subject cataloging, subject listing, subject subscription, issue submission, issue publication, issue receiving, subject rating, and information delivery engine.

22. The system of claim 21, wherein the information delivery engine further comprises a plurality of task queues and a plurality of threads that execute the tasks in the queues or transform the tasks between the task queues.

23. The system of claim 21, wherein the information delivery engine further comprises component that communicates with external systems to deliver issues to the subscribers based on the chosen delivery media for the subscriptions.

24. The system of claim 16, wherein the application server further provides an interface through which a subscriber may rate a subject listing that the subscriber has subscribed to.

* * * * *